United States Patent
Suzuki et al.

(10) Patent No.: US 9,511,614 B2
(45) Date of Patent: Dec. 6, 2016

(54) WATER-BASED INKJET INK FOR TAMPERING DETECTION, METHOD FOR INKJET PRINTING USING SAME, AND PRINTED ARTICLE

(71) Applicant: Nippon Kayaku Kabushiki Kaisha, Tokyo (JP)

(72) Inventors: Yuji Suzuki, Tokyo (JP); Tadahiko Tabe, Tokyo (JP); Yoshiki Akatani, Tokyo (JP)

(73) Assignee: NIPPON KAYAKU KABUSHIKI KAISHA, Tokyo (JP)

(*) Notice: Subject to any disclaimer, the term of this patent is extended or adjusted under 35 U.S.C. 154(b) by 247 days.

(21) Appl. No.: 14/381,160

(22) PCT Filed: Feb. 27, 2013

(86) PCT No.: PCT/JP2013/055235
§ 371 (c)(1),
(2) Date: Aug. 26, 2014

(87) PCT Pub. No.: WO2013/129523
PCT Pub. Date: Sep. 6, 2013

(65) Prior Publication Data
US 2015/0017402 A1    Jan. 15, 2015

(30) Foreign Application Priority Data
Feb. 28, 2012 (JP) .................. 2012-041450

(51) Int. Cl.
| | |
|---|---|
| C09D 11/328 | (2014.01) |
| B41M 3/14 | (2006.01) |
| B42D 25/378 | (2014.01) |
| C09D 11/322 | (2014.01) |
| B41J 2/01 | (2006.01) |
| C09D 11/10 | (2014.01) |

(52) U.S. Cl.
CPC ............... B42D 25/378 (2014.10); B41J 2/01 (2013.01); C09D 11/10 (2013.01); C09D 11/322 (2013.01); C09D 11/328 (2013.01); *B41M 3/14* (2013.01); *B42D 2033/20* (2013.01); *Y10T 428/24835* (2015.01)

(58) Field of Classification Search
CPC ............ C09D 11/328; B41J 2/01; B41M 3/14; B42D 25/378; B42D 2033/20; Y10T 428/24835

USPC ... 106/31.27, 31.44, 31.47; 347/20; 428/199
See application file for complete search history.

(56) References Cited

U.S. PATENT DOCUMENTS

| | | | |
|---|---|---|---|
| 7,507,283 B2 * | 3/2009 | Akatani | C09D 11/38 106/31.58 |
| 9,040,623 B2 * | 5/2015 | Akatani | C09D 11/328 524/590 |
| 2009/0113641 A1 * | 5/2009 | Akatani | C09D 11/328 8/552 |
| 2009/0148953 A1 | 6/2009 | Sadohara | |
| 2011/0114891 A1 | 5/2011 | Isobe et al. | |

FOREIGN PATENT DOCUMENTS

| | | |
|---|---|---|
| JP | 09/291235 | * 11/1997 |
| JP | 2000-129596 A | 5/2000 |
| JP | 2003-096368 A | 4/2003 |
| JP | 2008-031594 A | 2/2008 |
| JP | 2009-138161 A | 6/2009 |
| JP | 2009-149788 A | 7/2009 |
| JP | 2011-149107 A | 8/2011 |
| JP | 2011-225693 A | 11/2011 |
| WO | WO 2010/001887 A1 | 1/2010 |

OTHER PUBLICATIONS

English translation of the Written Opinion of the International Search Authority mailed May 14, 2013 for PCT/JP2013/055235; 6 pages.*
English translation of JP 09/291235; Nov. 1997; 23 pages.*

* cited by examiner

*Primary Examiner* — Helene Klemanski
(74) *Attorney, Agent, or Firm* — Knobbe Martens Olson & Bear LLP

(57) ABSTRACT

A water-based inkjet ink for tampering prevention which readily allows detection of evidence of tampering by visual inspection using a variety of organic solvents on the written content of a printed article for financial securities or the like, a method for inkjet printing using the same, and a printed article. The water-based inkjet ink for tampering detection contains at least one type of disperse or oil-soluble dye which includes no cyano groups or azo groups, at least one type of dispersing agent, at least one type of water-soluble organic solvent and water.

6 Claims, No Drawings

WATER-BASED INKJET INK FOR TAMPERING DETECTION, METHOD FOR INKJET PRINTING USING SAME, AND PRINTED ARTICLE

This application is the U.S. National Phase under 35 U.S.C. §371 of International Application PCT/JP2013/055235, filed Feb. 27, 2013, designating the U.S., and published in Japanese as WO 2013/129523 on Sep. 6, 2013, which claims priority to Japanese Patent Application No. 2012-041450, filed Feb. 28, 2012, the entire contents of which are incorporated herein by reference.

TECHNICAL FIELD

The present invention relates to a water-based inkjet ink for tampering detection in an inkjet printing system, a method for inkjet printing using the same, and a printed article printed by the printing method.

BACKGROUND ART

Securities represented by a check or a bill are widely used as a means to settle accounts with money by a means other than cash. Such securities have a value equivalent to the par value or the amount of money written thereon and are generally considered to be easily portable and excellent in security compared to carrying cash.

However, it may occur that a person with malicious intent uses illegal securities if securities can be easily forged and/or tampered with. For this reason, it is preferably considered that securities are provided with forgery and tampering prevention treatments by a variety of techniques.

As an example of a forgery prevention treatment, a treatment is provided in which the variable information such as the number to distinguish the kind of the cash or the bill, the number of the clearinghouse, the number of the financial institution, the number of the branch, the account number of the drawer, and the serial number of the check or the bill is printed at the bottom of checks or bills which are securities, and thus each item of the securities can be identified by the numbers. The variable information can be easily read visually under natural light.

In addition, the variable information can also be read as a magnetic waveform using a specific reading device by providing securities with a treatment such as setting the size and shape of each information to a fixed form; and printing the information with a magnetic ink having unique magnetic properties. It may be difficult to determine the authenticity of the securities which have only been subjected to the former treatment by visual inspection even in a case in which the securities have been forged using a general copier or printer. However, the presence or absence of forgery can be more easily determined using a specific reading device when the latter treatment has been performed.

Meanwhile, the printing process at the time of producing securities can be divided into two steps when roughly classified. In other words, the printing process is divided into a step of printing regulatory information to print a regulated character, pattern, or the like using a printing plate and a step of printing variable information to print variable information as described above without using a printing plate but by electrical signals sent from a computer.

An offset printing system having a fast printing speed has been mainly used in the step of printing regulatory information, and a digital printing system represented by an electrophotographic system or an inkjet system has been mainly used in the step of printing variable information in many cases.

In the digital printing system represented by an electrophotographic system or an inkjet system, a printing plate is not required; and it is possible to change freely the print information according to the print signal sent from a computer, or the like, and thus the digital printing system is a printing system suitable for the variable information printing or the small lot multi-item printing.

Since the digital printing system does not require a printing plate, the digital printing system does not require the cost required to create a new printing plate according to the design of the matter to be printed; labor required to replace and position the printing plate; a large amount of waste paper generated in the process for adjusting the printing conditions; or the like as well. For the reason described above, as a result, the printing often can be performed by the digital printing system at lower cost and in shorter delivery time than the offset printing system in a case in which small lot multi-item printing is performed.

In recent years, the printing speed and the printing precision of the inkjet printing have been remarkably improved, and thus the performance of the inkjet printing can be obtained at the level equal to that of the offset printing in terms of these respects. In addition, the demand on the market for a printed article tends to be small lot multi-item printing, and thus inkjet printing has started to be applied to the part of regulatory information that has been printed by the offset printing of the related art as well in some cases. By virtue of this, the two printing steps of printing the regulatory information and the variable information that have been performed in a combination of the offset printing of the related art and the inkjet printing can be performed by the inkjet printing on its own, and thus an increase in efficiency is expected.

In addition, there are some cases in which the amount of money is written on the securities such as a check or a bill using a stamp or the like in advance, but it is also general that the holder in due course writes the amount of money or the signature on the securities using a writing instrument such as a fountain pen, a ballpoint pen, or a magic pen. Various kinds of organic solvents, a correcting fluid, or the like are used in many cases when a person with malicious intent attempts to tamper with the information written on such securities.

Hence, it is important not to allow unauthorized use by providing securities with a treatment to prevent forgery as well as a treatment to facilitate tampering detection.

As the tampering detection method, a method using a fluorescent dye, an organic solvent-soluble dye, or the like has been proposed. For example, techniques of Patent Documents 1 to 3 are disclosed.

However, it is impossible to detect tampering by visual inspection in the case of using a fluorescent dye, and thus it is necessary to use a special light source. On the other hand, there is an advantage that tampering can be easily confirmed by visual inspection under natural light or normal lighting in the case of using an organic solvent-soluble dye.

However, there is a problem that the presence or absence of tampering cannot be clearly detected since the sheet or the like used in securities having a tampering detection function of the related art is discolored by bleed out caused by the configuration of the sheet itself or color development associated with heating.

In addition, as the means to resolve these problems, a method has also been proposed in which a dye or pigment soluble in an organic solvent is internally added to the paper in advance when the paper to be used for securities or the like is manufactured. However, there is a problem that this method requires extensive labor, and thus the production cost of the paper increases.

Moreover, the safety of chemical substances with regard to the environment or a human being has been highly considered in recent years, and thus improvement is strongly desired from this point of view as well. Among securities, there are also some securities that are frequently used in daily life instead of money. Securities having high safety are required since the contact of the securities with a human being constantly occurs in such a form of use of securities or the like.

A dye or a pigment soluble in an organic solvent is generally classified into a disperse dye or an oil-soluble dye. However, some disperse dyes or oil-soluble dyes are known to be harmful to the human body, and thus a contrivance is required which prevents the securities from being directly touched by the skin of a human being by, for example, over-coating the dye with a binder resin or the like, or minimizes the part being touched by the skin of a human being by internally adding the dye to the paper when such dyes are used. However, a contrivance is hardly a fundamental solution from the viewpoint of safety as well as there is a great problem that such a contrivance is technically complicated and leads to a cost increase. For this reason, a method is strongly desired which leads to low cost, exhibits high safety with regard to the environment or particularly a human being, and enables tampering to be easily detected.

Patent Document 1: Japanese Unexamined Patent Application, Publication No. 2000-129596

Patent Document 2: Japanese Unexamined Patent Application, Publication No. 2008-31594

Patent Document 3: Japanese Unexamined Patent Application, Publication No. 2011-149107

DISCLOSURE OF THE INVENTION

Problems to be Solved by the Invention

An object of the invention is to provide a water-based inkjet ink for tampering detection which exhibits high safety with regard to a human being as well as enables the detection of the traces of tampering by visual inspection, for example, when the tampering of the written contents of a printed article such as securities is attempted using various kinds of organic solvent, a method for inkjet printing using the same, and a printed article.

Means for Solving the Problems

The inventors have conducted intensive investigations to solve the problem described above, and as a result, found out that the problem can be solved using a water-based inkjet ink containing at least one kind selected from a disperse dye and an oil-soluble dye which do not have a cyano group and an azo group in the molecule, thereby completing the invention.

In other words, the invention relates to the following 1) to 7).

1)
A water-based inkjet ink for tampering detection including at least one kind of dye selected from a disperse dye and an oil-soluble dye, at least one kind of dispersing agent, at least one kind of water-soluble organic solvent, and water, in which the dye is a dye not having a cyano group and an azo group in the molecule.

2)
The water-based inkjet ink for tampering detection according to 1) above in which the dye is a quinophthalone dye.

3)
The water-based inkjet ink for tampering detection according to 1) above in which the dye is an anthraquinone dye.

4)
The water-based inkjet ink for tampering detection according to any one of 1) to 3) above in which the content of the dye is from 0.1 to 10% by mass with respect to a total mass of the ink.

5)
The water-based inkjet ink for tampering detection according to any one of 1) to 4) above in which the dye is a dye exhibiting negative in a reverse mutation test.

6)
A method for inkjet printing to perform printing by ejecting a droplet of the water-based inkjet ink for tampering detection according to any one of 1) to 5) above in response to a print signal and attaching the droplet onto a printing substrate.

7)
A printed article printed by the method for inkjet printing according to 6) above.

Effects of the Invention

According to the invention, it is possible to provide a water-based inkjet ink for tampering detection which exhibits high safety with regard to a human being as well as enables the detection of the traces of tampering by visual inspection, for example, when the tampering of the written contents of a printed article such as securities is attempted using various kinds of organic solvents, a method for inkjet printing using the same, and a printed article.

PREFERRED MODE FOR CARRYING OUT THE INVENTION

The dye contained in the water-based inkjet ink for tampering detection described above (hereinafter, referred to as the "water-based inkjet ink described above") can be selected from a known disperse dye and an oil-soluble dye. However, some of these dyes are known to be harmful to the human body as described above. Hence, a discussion has been conducted on the reverse mutation test (Ames test), which is one of the indicators of harmfulness. As a result, it has been found out that a positive (that is harmful) result tends to be obtained in the test when these dyes have a specific group in the molecule. It has been revealed that the specific group is a cyano group and/or an azo group.

Consequently, it is preferable to use a dye not having a cyano group and an azo group in the molecule as the at least one kind of dye selected from a disperse dye and an oil-soluble dye contained in the water-based inkjet ink described above from the viewpoint of safety with regard to a human being.

Specific examples of such a dye may include the following dyes.

As a yellow dye, C. I. Disperse Yellow 39, 42, 51, 54, 67, 71, 86, 92, 127, 134, 149, 160, 186, and 199; C. I. Solvent Yellow 114, and 163, or the like may be exemplified.

As an orange dye, C. I. Disperse Orange 81, 118, and 119, or the like may be exemplified.

As a red dye, C. I. Disperse Red 53, 55, 55:1, 59, 60, 70, 75, 86, 86:1, 91, 92, 127, 146, 190, 190:1, 191, 207, 283, and 302; C. I. Solvent Red 146, or the like may be exemplified.

As a violet or blue dye, C. I. Disperse Violet 8, 23, 26, 27, 28, 35, 36, and 57; C. I. Disperse Blue 5, 19, 54, 55, 56, 58, 60, 64, 64:1, 72, 72:1, 73, 73:1, 77, 81, 81:1, 87, 95, 108, 143, 145, 181, 185, and 197; C. I. Solvent Blue 36, 63, 83, 105, and 111, or the like may be exemplified.

Moreover, a quinophthalone dye or an anthraquinone dye is particularly preferably used from the viewpoint of safety among the dyes above.

Specific examples of such a quinophthalone dye may include C. I. Disperse Yellow 54, 67, 134, 149, and 160; C. I. Solvent Yellow 114, or the like.

In addition, in the same manner, specific examples of such an anthraquinone dye may include C. I. Disperse Yellow 51, 92, and 127; C. I. Disperse Orange 81 and 119; C. I. Disperse Red 53, 55, 55:1, 59, 60, 70, 75, 86, 86:1, 91, 92, 127, 146, 190, 190:1, 191, 207, 283, and 302; C. I. Disperse Violet 8, 23, 26, 27, 28, 35, 36, and 57; C. I. Disperse Blue 5, 19, 54, 55, 56, 60, 64, 64:1, 72, 72:1, 73, 73:1, 77, 81, 81:1, 87, 95, 143, 145, 181, 185, and 197; C. I. Solvent Yellow 163; C. I. Solvent Red 146; C. I. Solvent Blue 36, 63, 83, 105, and 111, or the like.

The dyes above may be used singly, or two or more kinds thereof may be used concurrently.

The purpose of the concurrent use of dyes is, for example, the preparation of a black ink. In other words, a black color is toned by appropriately combining a yellow dye and a red dye with a blue dye of the main constituent, and this can be used as a black dye.

In addition, plural dyes may be combined, for example, for the purpose of finely adjusting the color tone of blue, yellow, red, violet, or black to a more preferred color tone.

The dyes above can be used in a water-based inkjet ink described above in any form of powder, bulk, dry state, wet cake, and slurry. In addition, a small amount of dispersing agent may be included during the synthesis or after the synthesis of a dye for the purpose of suppressing the aggregation of dye particles when a dye is synthesized or the like in water.

The content of inorganic impurities in a dye is preferably as low as possible for the purpose of suppressing the adverse effect on the dispersion stability of the dye and the ejection accuracy of the formed ink. Examples of such inorganic impurities may include a chloride of a metal cation, for example, sodium chloride, a salt of sulfuric acid, for example, sodium sulfate.

The standard of the content of the inorganic impurities is, for example, the total content of sodium chloride and sodium sulfate is about 1% by mass or less with respect to the total mass of the dye. The lower limit thereof is 0% by mass, that is, it may be below the detection limit of the detection equipment.

Examples of the method to produce a dye containing fewer inorganic impurities may include a method using a reverse osmosis membrane which is a known technique; and a method in which a dry product, wet cake, or the like of the dye used is added to, for example, a water-soluble organic solvent such as a ketone solvent such as acetone, or a C1 to C4 alcohol such as methanol (for example, methanol, ethanol, isopropanol, or the like), or an aqueous water-soluble organic solvent and suspension purified or crystallized. The demineralization treatment or the like may be performed by these methods.

An arbitrary dispersing agent can be used as the dispersing agent contained in the water-based inkjet ink described above. Among them, a preferred configuration is either 1. to use at least one kind of copolymer anionic dispersing agent, or
2. to use at least one kind of condensation polymer anionic dispersing agent and at least one kind of nonionic dispersing agent concurrently.

Favorable dispersion stability is obtained by including a dispersing agent in the water-based inkjet ink described above in such a configuration.

Among the copolymer anionic dispersing agents above (that is, a copolymer usable as an anionic dispersing agent), preferred examples may include a copolymer of a compound containing an aromatic hydrocarbon group and (meth)acrylic acid (ester), and a copolymer of a compound containing an aromatic hydrocarbon group, (meth)acrylic acid (ester), and (anhydrous) maleic acid.

Examples of the copolymer of a compound containing an aromatic hydrocarbon group and (meth)acrylic acid (ester) may preferably include a copolymer having a hydrophilic moiety and a hydrophobic moiety in the molecule. Meanwhile, the term "(meth)acrylic acid (ester)" used in the present specification means to include acrylic acid, methacrylic acid, an acrylic acid ester, and a methacrylic acid ester, and the term "(anhydrous) maleic acid" used in the present specification means to include maleic anhydride and maleic acid. For the copolymerization with a compound containing an aromatic hydrocarbon group, a compound may be used singly among these, or some or all of these may be used concurrently.

In addition, a copolymer of a compound containing an aromatic hydrocarbon group, (meth)acrylic acid (ester), and (anhydrous) maleic acid may be obtained by adding (anhydrous) maleic acid at the time of performing the copolymerization.

A compound containing an aromatic hydrocarbon group is preferably used as the hydrophobic moiety contained in the molecule of a copolymer for the purpose of enhancing the interaction with a dye. As the aromatic hydrocarbon group, phenyl, phenylene, naphthyl, or naphthalene-diyl is preferable (preferably phenyl or phenylene and more preferably phenyl).

Specific examples of these copolymers may include a (α-methyl)styrene-acrylic acid copolymer, a (α-methyl)styrene-acrylic acid-acrylic acid ester copolymer, a (α-methyl)styrene-methacrylic acid copolymer, a (α-methyl)styrene-methacrylic acid-acrylic acid ester copolymer, a (α-methyl)styrene-(anhydrous) maleic acid copolymer, an acrylic acid ester-(anhydrous) maleic acid copolymer, a (α-methyl)styrene-acrylic acid ester-(anhydrous) maleic acid copolymer, an acrylic acid ester-styrenesulfonic acid copolymer, a (α-methyl)styrene-methacrylsulfonic acid copolymer, an acrylic acid ester-allylsulfonic acid copolymer, a polyester-acrylic acid copolymer, a polyester-acrylic acid-acrylic acid ester copolymer, a polyester-methacrylic acid copolymer, and a polyester-methacrylic acid-acrylic acid ester copolymer. Those having styrene as the compound containing an aromatic hydrocarbon group are preferable among these.

Meanwhile, the term "(α-methyl)styrene" used in the present specification means to include α-methylstyrene and styrene.

Some of these copolymers are also available as a commercial product, and for example, the JONCRYL® series such as JONCRYL® 67, 678, 586, 611, 680, 682, 683, and 690 (all of them are a trade name) manufactured by BASF Japan Ltd. are preferable. Meanwhile, it should be noted that the superscript "®" refers to a registered trademark in the present specification.

Examples of the condensation polymer anionic dispersing agent may preferably include a formalin condensate of an aromatic sulfonic acid.

Examples of the "aromatic sulfonic acid" in the formalin condensate of an aromatic sulfonic acid may include an alkylnaphthalenesulfonic acid such as creosote oil sulfonic acid, cresolsulfonic acid, phenolsulfonic acid, β-naphtholsulfonic acid, methylnaphthalenesulfonic acid, and butylnaphthalene sulfonic acid, a mixture of β-naphthalenesulfonic acid with β-naphtholsulfonic acid, a mixture of cresol sulfonic acid and 2-naphthol-6-sulfonic acid, and ligninsulfonic acid.

The formalin condensate of an aromatic sulfonic acid may also be available as a commercial product. Examples of the commercially available product may include the Demol® series such as Demol® N (β-naphthalenesulfonic acid) and SN-B (butylnaphthalenesulfonic acid) (both of them are a trade name) manufactured by Kao Corporation, and the Lavelin® series such as Lavelin® W-40 (creosote oil sulfonic acid) and AN-40 (methylnaphthalenesulfonic acid) (both of them are a trade name) manufactured by DAI-ICHI KOGYO SEIYAKU CO., LTD. The compounds written in the brackets attached to the back of each trade name represents the "aromatic sulfonic acid" moiety above, and all of them are a formalin condensate.

All of the anionic dispersing agents described above may be used in the form of a salt. Preferred examples of the salt may include a salt with an alkali metal cation and specific examples thereof may include a sodium salt, a lithium salt, and a potassium salt; an ammonium salt; and an amine salt and specific examples thereof may include a monoethanolamine salt, a diethanolamine salt, and a triethanolamine salt.

As the nonionic dispersing agent contained in the water-based inkjet ink described above, those selected from an ethylene oxide adduct of a phytosterol and an ethylene oxide adduct of a cholestanol may be preferably exemplified.

The term "phytosterol" means to include both a phytosterol and a hydrogenated phytosterol in the present specification. Examples of the ethylene oxide adduct of a phytosterol may include an ethylene oxide adduct of a phytosterol and an ethylene oxide adduct of a hydrogenated phytosterol.

In the same manner, the term "cholestanol" means to include both a cholestanol and a hydrogenated cholestanol in the present specification. Examples of the ethylene oxide (EO) adduct of a cholestanol may include an ethylene oxide adduct of a cholestanol and an ethylene oxide adduct of a hydrogenated cholestanol. The amount of ethylene oxide added per 1 mole of a phytosterol or a cholestanol is about from 10 to 50 moles, and those having a HLB of about from 13 to 20 are preferable.

The ethylene oxide adduct of a phytosterol may also be available as a commercial product. For example, the NIKKOL® series such as NIKKOL® BPS-20, BPS-30 (an EO adduct of a phytosterol), and BPSH-25 (an EO adduct of a hydrogenated phytosterol) (all of them are a trade name) manufactured by Nikko Chemicals Co., Ltd. may be available on the market.

In addition, examples of the commercially available product of the ethylene oxide adduct of a cholestanol may include NIKKOL® DHC-30 (an EO adduct of a cholestanol) manufactured by Nikko Chemicals Co., Ltd.

When at least one kind of condensation polymer anionic dispersing agent and at least one kind of nonionic dispersing agent are used concurrently as the configuration of the dispersing agent contained in the water-based inkjet ink described above, a combination is preferable in which the former is an anionic dispersing agent selected from the group consisting of a formalin condensate of β-naphthalenesulfonic acid; a formalin condensate of an alkylnaphthalenesulfonic acid; and a formalin condensate of creosote oil sulfonic acid and the latter is a nonionic dispersing agent selected from an ethylene oxide adduct of a phytosterol and an ethylene oxide adduct of a cholestanol.

Among them, a combination is more preferable in which the condensation polymer anionic dispersing agent is a formalin condensate of creosote oil sulfonic acid.

Glycerin, a glycerol polymer, and a glycol solvent are preferably used as the water-soluble organic solvent contained in the water-based inkjet ink described above. It is possible to prepare an inkjet ink while maintaining the dispersion stability when formed into a dispersion since the above described dye which has high safety with regard to a human being exhibits low solubility in glycerin and a polymer thereof or a glycol solvent. Glycerin can be readily available as a commercial product. Examples thereof may preferably include refined glycerin manufactured by Sakamoto Yakuhin Kogyo Co., Ltd.

The average degree of polymerization of the glycerol polymer is from 2 to 14, preferably from 2 to 12, and more preferably from 2 to 10. The average degree of polymerization is described as the numerical value rounded off at the first decimal place. Specific examples of these glycerol polymers may include a compound such as diglycerin, triglycerin, tetraglycerin, pentaglycerin, hexaglycerin, heptaglycerin, octaglycerin, nonaglycerin, decaglycerin, undecaglycerin, dodecaglycerin, tridecaglycerin, or tetradecaglycerin, and a mixture thereof.

The glycerol polymer having a degree of polymerization of 13 or more is not used singly but is preferably used as a mixture with a glycerol polymer having a smaller degree of polymerization. At that time, the mixture may be used after adjusting the average degree of polymerization thereof in a range of from 2 to 12 and preferably from 2 to 10.

Examples of the commercially available product of the glycerol polymer may include diglycerin S (average degree of polymerization=2) with a trade name, polyglycerol #310 (average degree of polymerization=4) with a trade name, and polyglycerol #750 (average degree of polymerization=10) with a trade name manufactured by Sakamoto Yakuhin Kogyo Co., Ltd.

Among the water-soluble organic solvents, examples of the glycol solvent may include a polyol compound (preferably a diol compound) which has a total carbon number of from 2 to 6 and may have one ether bond in one molecule. Specific examples thereof may preferably include ethylene glycol, diethylene glycol, triethylene glycol, propylene glycol, dipropylene glycol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexanediol, and 1,6-hexanediol.

Among these, ethylene glycol, propylene glycol, diethylene glycol, 1,5-pentanediol, and 1,6-hexanediol are more preferable.

The water-soluble organic solvents described above may be used singly, or two or more kinds thereof may be used concurrently.

The water-based inkjet ink described above contains a dye, a dispersing agent, a water-soluble organic solvent, and water. Another additive may be added thereto if necessary in a range in which the effect obtained by the water-based inkjet ink is not impaired.

Examples of another additive may include an additive such as an antiseptic and antifungal agent, a pH adjusting agent, a chelating agent, a rust-preventive agent, a ultraviolet absorber, an anti-foaming agent, or a surface tension adjuster.

Examples of the antiseptic and antifungal agent may include a compound such as an organic sulfur-based compound, an organic nitrogen sulfur-based compound, an organic halogen-based compound, a haloallylsulfone-based compound, an iodopropargyl-based compound, a N-haloalkylthio-based compound, a benzothiazole-based compound, a nitrile-based compound, a pyridine-based compound, an 8-oxyquinoline-based compound, an isothiazolin-based compound, a dithiol-based compound, a pyridineoxide-based compound, a nitropropane-based compound, an organic tin-based compound, a phenol-based compound, a quaternary ammonium salt-based compound, a triazine-based compound, a thiadiazin-based compound, an anilide-based compound, an adamantane-based compound, a dithiocarbamate-based compound, a brominated indanone-based compound, a benzyl bromoacetate-based compound, and an inorganic salt-based compound.

Examples of the organic halogen-based compound may include pentachlorophenol sodium salt. Examples of the pyridineoxide-based compound may include sodium pyridinethione-1-oxide and zinc pyridinethione-1-oxide. Examples of the isothiazoline-based compound may include amine salt of 1-benzisothiazolin-3-one 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride.

Examples of another antiseptic and antifungal agent may include sodium dehydroacetate, sodium sorbate, and sodium benzoate; and PROXEL® GXL (S) and PROXEL® XL-2 (S) (both of them are a trade name) manufactured by Arch Chemicals, Inc.

An arbitrary substance can be used as the pH adjusting agent as long as the pH of the ink can be controlled in the range of from 6.0 to 11.0 for the purpose of improving the storage stability of the ink. Examples thereof may include an alkanolamine such as diethanolamine, triethanolamine, dimethylethanolamine, and diethylethanolamine; a hydroxide of an alkali metal such as lithium hydroxide, sodium hydroxide, potassium hydroxide, and lithium hydroxide; ammonium hydroxide; a carbonate of alkali metal such as lithium carbonate, sodium carbonate, and potassium carbonate; and an amino sulfonic acid such as taurine.

Examples of the chelating reagent may include disodium ethylenediaminetetraacetate, sodium nitrilotriacetate, sodium hydroxyethylethylenediaminetriacetate, sodium diethylenetriaminepentaacetate, and sodium uracildiacetate.

Examples of the rust-preventive agent may include an acid sulfite salt, sodium thiosulfate, ammonium thioglycolate, diisopropyl ammonium nitrite, pentaerythritol tetranitrate, and dicyclohexyl ammonium nitrite.

Examples of the ultraviolet absorber may include a benzophenone-based compound, a benzotriazole-based compound, a cinnamic acid-based compound, a triazine-based compound, and a stilbene-based compound. In addition, it is also possible to use a compound, a so-called fluorescent brightening agent, which absorbs ultraviolet light but emits fluorescence and is represented by a benzoxazole-based compound, or the like.

Examples of the anti-foaming agent may include a highly oxidized oil based compound, a glycerin fatty acid ester-based compound, a fluorine-based compound, a silicone-based compound, and an acetylene-based compound.

As the surface tension adjuster, a surfactant may be exemplified, and examples thereof may include an anionic surfactant, an amphoteric surfactant, a cationic surfactant, and a nonionic surfactant.

Examples of the anionic surfactant may include an alkylsulfocarboxylic acid salt, an α-olefin sulfonic acid salt, a polyoxyethylene alkyl ether acetic acid salt, N-acylamino acid and a salt thereof, a N-acylmethyltaurine salt, an alkylsulfate polyoxyalkyl ether sulfuric acid salt, an alkylsulfate polyoxyethylene alkyl ether phosphoric acid salt, rosin acid soap, a castor oil sulfuric acid ester, a lauryl alcohol sulfuric acid ester salt, an alkylphenolic phosphate ester, an alkylated phosphate ester, an alkylaryl sulfonic acid salt, a diethyl sulfosuccinic acid salt, a diethylhexyl sulfosuccinic acid salt, a dioctyl sulfosuccinic acid salt, and the like.

Examples of the cationic surfactant may include a 2-vinylpyridine derivative, a poly-4-vinylpyridine derivative, and the like.

Examples of the amphoteric surfactant may include lauryldimethylamino acetate betaine, 2-alkyl-N-carboxymethyl-N-hydroxyethylimidazolinium betaine, coconut oil fatty acid amidepropyldimethylamino acetate betaine, polyoctylpolyaminoethylglycine, imidazoline derivative, and the like.

Examples of the nonionic surfactant may include an ether-based nonionic surfactant such as polyoxyethylene nonylphenyl ether, polyoxyethylene octylphenyl ether, polyoxyethylene dodecylphenyl ether, polyoxyethylene oleyl ether, polyoxyethylene lauryl ether, and polyoxyethylene alkyl ether; an ester-based nonionic surfactant such as polyoxyethylene oleate ester, polyoxyethylene distearate ester, sorbitan laurate, sorbitan monostearate, sorbitan monooleate, sorbitan sesquioleate, polyoxyethylene monooleate, and polyoxyethylene stearate; an acetylene glycol (alcohol)-based nonionic surfactant such as 2,4,7,9-tetramethyl-5-decyne-4,7-diol, 3,6-dimethyl-4-octyne-3,6-diol, and 3,5-dimethyl-1-hexyn-3-ol; Surfynol® 104, 82, and 465, and Olfine® STG (all of them are a trade name) manufactured by Nissin Chemical Industry Co., Ltd.; and Tergitol® 15-S-7 (trade name) manufactured by SIGMA-ALDRICH Co. LLC.

As an additive, an acetylene glycol (alcohol)-based compound such as 2,4,7,9-tetramethyl-5-decyne-4,7-diol, 3,6-dimethyl-4-octyne-3,6-diol, and 3,5-dimethyl-1-hexyn-3-ol may be contained in the water-based inkjet ink described above. It is preferable to include the compound for the purpose of improving the ejection responsiveness in the inkjet printing.

Examples of the acetylene glycol (alcohol)-based compound may include 2,4,7,9-tetramethyl-5-decyne-4,7-diol and a polyether modified product thereof, 3,6-dimethyl-4-octyne-3,6-diol and a polyether modified product thereof, and 3,5-dimethyl-1-hexyn-3-ol and a polyether modified product thereof. Such a compound can also be available as a commercial product.

Specific examples thereof may preferably include Surfynol® 420 (polyether modified 2,4,7,9-tetramethyl-5-decyne-4,7-diol) and Surfynol® 440 (polyether modified 2,4,7,9- tetramethyl-5-decyne-4,7-diol) (both of them are a trade name) manufactured by Nissin Chemical Industry Co., Ltd.

The additives described above may be used singly or concurrently. The content of any additive is from 0 to 5% by mass and preferably about from 0.01 to 3% by mass with respect to the total mass of the water-based inkjet ink described above.

Meanwhile, the surface tension of the water-based inkjet ink described above is usually from 20 to 70 mN/m and preferably from 20 to 50 mN/m, and the viscosity thereof is preferably adjusted to from 2 to 20 mPa·s from the viewpoint of ejection responsiveness thereof or the like. In detail, the physical properties may be finely adjusted to appropriate values in consideration of the ejection amount and response speed of the printer to be used and the flight characteristics of the ink droplet.

The viscosity may be adjusted by the contents of the dispersing agent and the water-soluble organic solvent; and the surface tension may be adjusted using a surfactant, respectively.

In the production of the water-based inkjet ink described above, water used in the preparation of the ink is preferably water having fewer impurities such as ion exchanged water or distilled water. In addition, the contaminants in the ink may be removed by performing microfiltration using a membrane filter or the like after preparation of the ink.

It is preferable to perform the microfiltration of the ink in order to use it as inkjet ink. The pore size of the filter used for the microfiltration is usually from 1 μm to 0.1 μm and preferably from 1 μm to 0.2 μm.

In the preparation of water-based inkjet ink described above, the order is not particularly limited in which respective components such as an additive are added. However, a method is preferably in which an ink is prepared by preparing an aqueous dispersion of a dye, a dispersing agent, and water and then adding a water-soluble organic solvent and an additive if necessary to this dispersion.

As the method of preparing an aqueous dispersion, a method using a sand mill (bead mill), a roll mill, a ball mill, a paint shaker, an ultrasonic dispersion machine, or a microfluidizer may be exemplified. Among these, a sand mill (bead mill) is preferably used. In addition, dispersion is preferably prepared under the condition in which the filling rate of the beads is increased using beads having a small diameter (about from 0.01 mm to 1 mm) when a sand mill (bead mill) is used.

It is possible to reduce the particle size of the dye and thus obtain a dispersion having a favorable dispersibility by performing the preparation under such a condition.

In addition, it is also preferable to remove the solid components having a large particle size by performing filtration and/or centrifugation of the dispersion after the preparation thereof.

In addition, when foaming or the like occurs during the preparation of the dispersion, a significantly slight amount of the anti-foaming agent such as the silicone-based anti-foaming agent or the acetylene-based anti-foaming agent described above may be added for the purpose of suppressing this.

The contents of the respective components used in the preparation of the aqueous dispersion above in the total mass of the slurry before being subjected to the dispersion treatment are as follows.

The dye is approximately from 20 to 40% by mass with respect to the total mass of the slurry, the dispersing agent is from 10 to 100% by mass with respect to the dye, and the balance is water.

The dye is approximately from 20 to 40% by mass, the condensation polymer anionic dispersing agent is from 10 to 100% by mass with respect to the dye, the nonionic dispersing agent is from 5 to 20% by mass with respect to the anionic dispersing agent, and the balance is water when at least one kind of condensation polymer anionic dispersing agent and at least one kind of nonionic dispersing agent are used concurrently as the dispersing agent.

The content of the dye in the ink can be adjusted to a desired amount by adding a water-soluble organic solvent and water for dilution, if necessary, to the dispersion prepared as described above.

The contents of the respective components in the water-based inkjet ink described above are as follows with respect to the total mass of the ink, and all the values described below are on the basis of mass.

[1. As the Dispersing Agent, when a Copolymer Anionic Dispersing Agent is Used]

In general, the dye is usually from 0.1 to 10% and preferably from 0.1 to 5%, but for the reason to be described below, particularly preferably from 0.1 to 3% as a total amount; the dispersing agent is usually from 0.05 to 10%, preferably from 0.05 to 5%, and more preferably from 0.05 to 3%; the water-soluble organic solvent is usually from 5 to 80%, preferably from 10 to 75%, and more preferably from 15 to 70%; and the balance is water.

[2. When a Condensation Polymer Anionic Dispersing Agent and a Nonionic Dispersing Agent are Used Concurrently]

In general, the dye is usually from 0.1 to 10% and preferably from 0.1 to 5% in a total amount, but for the reason to be described below, particularly preferably from 0.1 to 3%; the condensation polymer anionic dispersing agent is usually from 0.05 to 10%, preferably from 0.05 to 5%, and more preferably from 0.05 to 3%; nonionic dispersing agent is usually from 0.0025 to 2%, preferably from 0.0025 to 1%, and more preferably from 0.0025 to 0.6%; the water-soluble organic solvent is usually from 5 to 80%, preferably from 10 to 75%, and more preferably from 15 to 70%; and the balance is water.

The reverse mutation test (Ames test) is a test to examine the mutagenicity of a chemical substance using a microorganism. The reverse mutation test is a test that can evaluate whether a test substance induces a mutation thereof or not in a short period of time, and is used as an index indicating the safety of a chemical substance.

In general, the test is performed using *Salmonella typhimurium* (TA100, TA98, or the like) or the like as the strain and by setting the concentration of the test sample to from 5 to 7 stages. In strains, there are strains exhibiting different mutation types called a base pair substitution type (for example, TA100), a frameshift type (for example, TA98), and the like. For this reason, both of the strains exhibiting different mutation types are generally used when the test is performed.

In addition, it is also general that tests are performed by adding and not adding a metabolizing enzyme called "S9mix" and a coenzyme and the results thereof are compared with each other since there is a compound exhibiting mutagenicity for the first time, for example, by being subjected to the metabolism in the human body.

The test result is determined as "positive" when mutagenicity is exhibited, and the test result is determined as "negative" when mutagenicity is not exhibited. It is particularly preferable to choose a dye not exhibiting mutagenicity, that is, determined as "negative" in the reverse mutation test as the dye contained in the water-based inkjet ink described above from the viewpoint of safety.

Meanwhile, the test method of the reverse mutation test in Japan is presented in, for example, the Pharmaceutical Affairs Law, the Industrial Safety and Health Law, the Chemical Substances Control Law, and the like as a guideline, and is usually conducted in conformity with the guideline.

The method for inkjet printing described above is a method for inkjet printing to perform printing by ejecting the (small) droplets of the water-based inkjet ink described above in response to the print signal and attaching the droplets on a printing substrate.

The printing substrate is not particularly limited, but is preferably a cellulose fiber. Among the cellulose fibers, those formed into paper, that is, paper are more preferable. As the paper, those not having an ink-receiving layer such as plain paper can also be used. In addition, paper having an ink-receiving layer formed by, for example, an inorganic fine particle such as silica, a water absorptive polymer, or the like is still more preferable. Paper called an exclusive paper for inkjet is included as such paper having an ink-receiving layer.

In many cases, a high-definition pattern, character (also called a micro character, or the like), or the like which is hardly reproduced by a copier is printed on the front surface and/or back surface of securities or the like for the purpose of preventing forgery as well as to detect tampering. The method for inkjet printing using the water-based inkjet ink described above can also sufficiently print such a high-definition pattern or character as well. Accordingly, the printing method is also effective for the prevention of easy forgery by copying or the like. The printed article obtained by performing the method for inkjet printing described above is also included in the scope of the invention.

The printing may be performed on either the front surface or the back surface or on both thereof when the printing is performed on a printing substrate.

In addition, the solid printing of the inkjet ink described above on a printing substrate may be performed since a high-definition pattern or the like is not desirable when the purpose of printing is tampering detection.

When the printed article above is used as securities or the like, the holder in due course writes the required information, such as the amount of money, on the securities or the like using a writing instrument such as a fountain pen, a ballpoint pen, a magic pen, a stamp, or the like to use them. Among these writing instruments or stamps, there are generally water-based ones and oil-based ones, and an oil-based writing instrument or stamp is preferably used in the case of the printed article described above.

It is difficult to confirm the information written by the holder visually when the dye is contained to too great an extent in the ink in a case in which printing has been performed on the surface of the printed article on which required information would be written by the holder in due course in advance using the water-based inkjet ink described above. The upper limit of the total mass of the dye contained in the water-based inkjet ink described above is particularly preferably about 3% by mass with respect to the total mass of the ink in order to secure the visibility. However, the upper limit of the total mass of the dye is not limited to 3% by mass and may be in the range described above when the printing is performed on the opposite surface.

Various kinds of organic solvents are used for tampering when the above information written using an oil-based instrument or stamp is tampered. Specific examples thereof may include a ketone solvent such as acetone, an ester solvent such as butyl acetate, an aromatic hydrocarbon solvent such as toluene, a halogenated hydrocarbon solvent such as chloroform, and a polyhydric alcohol monoalkyl ether solvent such as ethylene glycol monomethyl ether.

When the above organic solvent used for tampering is brought into contact with the printed article printed using the water-based inkjet ink described above, the dye attached at the portion at which an organic solvent has been brought into contact with the printed article dissolves into the organic solvent and diffuses, and thus tampering can be easily detected visually as apparent "bleeding". The water-based inkjet ink described above can be used for tampering detection in this way.

However, it is difficult to detect tampering by visual inspection when the total mass of the dye contained in the water-based inkjet ink described above is too little. The lower limit of the total mass of the dye contained in the water-based inkjet ink described above is particularly preferably about 0.1% by mass with respect to the total mass of the ink in order to improve the tampering detection by visual inspection.

In general, the printed article used as securities or the like has a thin thickness, as the above organic solvent used for tampering penetrates rapidly to the other surface even when the above organic solvent is brought into contact with one surface of the printed article. For this reason, the presence or absence of tampering of the printed article printed using the water-based inkjet ink described above can be easily detected by visual inspection since the dye dissolves into the organic solvent and diffuses on both the surface on which the printed article is in contact with the organic solvent and the surface on which the printed article is not in contact with the organic solvent.

It is also possible to use a special paper or the like if necessary as the printing substrate when the printing is performed using the water-based inkjet ink described above. For example, all of the paper or the sheet materials described in Patent Documents 1 to 3 above disclose a technique using a water-insoluble and organic solvent-soluble dye for tampering prevention or the like. The water-based inkjet ink described above can also be concurrently used with such a technique.

By the use of the water-based inkjet ink described above, it is possible to easily detect the presence or absence of tampering by visual inspection without using a special reading device or the like as well, as it is possible to print both the regulatory information and the variable information of securities or the like at the same time without using a printing plate.

In addition, it is possible to provide a treatment for the tampering detection to the printing substrate along with the printing of both the regulatory information and the variable information by performing the inkjet printing using the water-based inkjet ink described above. This fact means that securities represented by a check or a bill can be produced through the in-line one step by the inkjet printing, and thus the production efficiency thereof can be significantly improved.

In addition, by the use of the water-based inkjet ink described above, it is possible to reduce the unit manufacturing cost of securities or the like since paper generally available can be used as the base paper for creating the securities or the like without necessarily using a special paper produced through a special process in which, for example, a dye is internally added to the paper at the time of manufacturing paper. In addition, the strike through of the dye does not occur when the water-based inkjet ink described above is printed on a printing substrate, and thus double-sided printing can also be performed.

Moreover, the dye contained in the water-based inkjet ink described above does not exhibit mutagenicity, and thus has a high safety with regard to the environment or a human being. Consequently, the printed article printed using the water-based inkjet ink does not require a protective means for the dye, for example, an overcoat, but can be used safely even when there is constant contact thereof with the human body.

EXAMPLES

Hereinafter, the invention is explained in more detail with reference to Examples, but the invention is not limited to these Examples. In Examples, the term "part" means "part by mass" and the term "%" means "% by mass" respectively unless otherwise stated.

As the dye in Examples, each of the following dyes was used.

C. I. Disperse Red 60 (hereinafter, referred to as "DR 60"): manufactured by NIPPON KAYAKU Co., Ltd., trade name: Kayaset® Red B Meanwhile, C. I. Disperse Red 60 is known to be the same dye as C. I. Solvent Red 146.

C. I. Disperse Yellow 54 (hereinafter, referred to as "DY 54"): manufactured by NIPPON KAYAKU Co., Ltd., trade name: Kayaset® yellow A-G C. I. Disperse Blue 72 (hereinafter, referred to as "DB 72"): manufactured by NIPPON KAYAKU Co., Ltd., trade name: Kayaset® Blue A-2R Meanwhile, C. I. Disperse Blue 72 is known to be the same dye as C. I. Solvent Blue 83.

C. I. Disperse Yellow 160 (hereinafter, referred to as "DY 160"): manufactured by NIPPON KAYAKU Co., Ltd., Kayaset® yellow A-H Meanwhile, all of the respective dyes used in Examples 1 to 10 are dyes not having a cyano group and an azo group in the molecule thereof.

Example 1

Step 1

The dispersion treatment of a mixture consisting of DR 60 (30 parts), Lavelin® W-40 (45 parts), NIKKOL® BPS-30 (2 parts), and ion exchanged water (23 parts) was performed by a sand mill together with glass beads having a diameter of 0.2 mm for about 15 hours while cooling by passing through cooling water at 10° C. A dispersion was prepared by adding ion exchanged water (100 parts) to the liquid thus obtained. The dispersion thus obtained was filtered using the glass fiber filter GC-50 (manufactured by Toyo Roshi Kaisha, Ltd., the pore size of the filter is 0.5 μm) so as to remove a component having a large particle size, whereby the desired aqueous dispersion having a content of dye of 15% was obtained.

Step 2

To 6.67 parts of the aqueous dispersion obtained in Step 1 of Example 1, diglycerin S (40 parts, manufactured by Sakamoto Yakuhin Kogyo Co., Ltd.), propylene glycol (8 parts), Surfynol® 420 (0.1 parts), and ion exchanged water (45.23 parts) were added and mixed together, whereby the water-based inkjet ink of the invention having a content of dye adjusted to 1% was obtained.

Example 2

The water-based inkjet ink of the invention was obtained in the same manner as in Example 1 except using 30 parts of DY 54 instead of DR 60.

Example 3

The water-based inkjet ink of the invention was obtained in the same manner as in Example 1 except using 30 parts of DB 72 instead of DR 60.

Preparation Example 1

Ion exchanged water (65.6 parts) was added to Joncryl® 678 (30 parts) and the temperature thereof was raised to 70° C. while stirring. A solution was prepared by adding sodium hydroxide (4.4 parts) to the liquid thus obtained. The solution thus obtained is referred to as the "J 678 solution" hereinafter.

Example 4

Step 1

The dispersion treatment of a mixture consisting of C. I. Disperse Red 92 (hereinafter, referred to as "DR 92") (30 parts), the J 678 solution (40 parts), and ion exchanged water (30 parts) was performed by a sand mill together with glass beads having a diameter of 0.2 mm for about 20 hours while cooling by passing through cooling water at 10° C. A dispersion was prepared by adding ion exchanged water (100 parts) to the liquid thus obtained. The dispersion thus obtained was filtered using the glass fiber filter GC-50 (manufactured by Toyo Roshi Kaisha, Ltd., the pore size of the filter is 0.5 μm) so as to remove a component having a large particle size, whereby the desired aqueous dispersion having a content of dye of 15% was obtained.

Step 2

To 6.67 parts of the aqueous dispersion obtained in Step 1 of Example 4, refined glycerin (45 parts, manufactured by Sakamoto Yakuhin Kogyo Co., Ltd.), propylene glycol (10 parts), Surfynol® 420 (0.1 parts), and ion exchanged water (38.23 parts) were added and mixed together, whereby the water-based inkjet ink of the invention having a content of dye of 1% was obtained.

Example 5

The water-based inkjet ink of the invention was obtained in the same manner as in Example 4 except using 30 parts of DY 160 instead of DR 92.

Example 6

The water-based inkjet ink of the invention was obtained in the same manner as in Example 4 except using 30 parts of C. I. Disperse Blue 60 (hereinafter, referred to as "DB 60") instead of DR 92.

Example 7

To the aqueous dispersion obtained in Example 1 (1.35 parts), the aqueous dispersion obtained in Example 2 (1 part), and the aqueous dispersion obtained in Example 3 (4.32 parts), refined glycerin (45 parts, manufactured by Sakamoto Yakuhin Kogyo Co., Ltd.), propylene glycol (10 parts), Surfynol® 420 (0.1 parts), and ion exchanged water (38.23 parts) were added and mixed together, whereby the water-based inkjet ink of the invention having a content of dye of 1% was obtained.

Example 8

To the aqueous dispersion obtained in Example 1 (0.14 parts), the aqueous dispersion obtained in Example 2 (0.10 parts), and the aqueous dispersion obtained in Example 3 (0.43 parts), refined glycerin (45 parts, manufactured by Sakamoto Yakuhin Kogyo Co., Ltd.), propylene glycol (10 parts), Surfynol® 420 (0.1 parts), and ion exchanged water (44.23 parts) were added and mixed together, whereby the water-based inkjet ink of the invention having a content of dye of 0.1% was obtained.

Example 9

To the aqueous dispersion obtained in Example 1 (4.05 parts), the aqueous dispersion obtained in Example 2 (3.00 parts), and the aqueous dispersion obtained in Example 3 (12.95 parts), refined glycerin (45 parts, manufactured by Sakamoto Yakuhin Kogyo Co., Ltd.), propylene glycol (10 parts), Surfynol® 420 (0.1 parts), and ion exchanged water (24.90 parts) were added and mixed together, whereby the water-based inkjet ink of the invention having a content of dye of 3.0% was obtained.

Example 10

To the aqueous dispersion obtained in Example 1 (6.75 parts), the aqueous dispersion obtained in Example 2 (5.00 parts), and the aqueous dispersion obtained in Example 3 (21.59 parts), refined glycerin (40 parts, manufactured by Sakamoto Yakuhin Kogyo Co., Ltd.), propylene glycol (10 parts), Surfynol® 420 (0.1 parts), and ion exchanged water (16.56 parts) were added and mixed together, whereby the water-based inkjet ink of the invention having a content of dye of 5% was obtained.

Comparative Example 1

The water-based inkjet ink for comparison was obtained in the same manner as in Example 1 except using 30 parts of C. I. Disperse Blue 359 (hereinafter, referred to as "DB 359") as a dye having a cyano group but not having an azo group in the molecule instead of DR 60.

Comparative Example 2

The water-based inkjet ink for comparison was obtained in the same manner as in Example 1 except using 30 parts of C. I. Disperse Red 152 (hereinafter, referred to as "DR 152") as a dye not having a cyano group but having an azo group in the molecule instead of DR 60.

Comparative Example 3

The water-based inkjet ink for comparison was obtained in the same manner as in Example 1 except using 30 parts of C. I. Disperse Blue 165 (hereinafter, referred to as "DB 165") as a dye having a cyano group and an azo group in the molecule instead of DR 60.

Comparative Example 4

To the aqueous dispersion obtained in Example 1 (0.01 parts), the aqueous dispersion obtained in Example 2 (0.01 parts), and the aqueous dispersion obtained in Example 3 (0.05 parts), refined glycerin (45 parts, manufactured by Sakamoto Yakuhin Kogyo Co., Ltd.), propylene glycol (10 parts), Surfynol® 420 (0.1 parts), and ion exchanged water (44.83 parts) were added and mixed together, whereby the water-based inkjet ink for comparison having a content of dye of 0.01% was obtained.

The proportions of respective components are summarized in the following Table 1 and Table 2 with regard to the ink compositions of Examples 1 to 9 and Comparative Examples 1 to 5. The values in the respective Tables represent the parts of the respective components, and the abbreviations or the like of the respective components represent the following meanings.

DR 60: C. I. Disperse Red 60
DY 54: C. I. Disperse Yellow 54
DB 72: C. I. Disperse Blue 72
DR 92: C. I. Disperse Red 92
DY 160: C. I. Disperse Yellow 160
DB 60: C. I. Disperse Blue 60
DB 359: C. I. Disperse Blue 359
DR 152: C. I. Disperse Red 152
DB 165: C. I. Disperse Blue 165
W40: Lavelin® W-40
BPS 30: NIKKOL® BPS-30
J 678: JONCRYL® 678
G: refined glycerin
DG: diglycerin S
PG: propylene glycol
SF 420: Surfynol® 420

Meanwhile, the parts of the component used as an aqueous solution was described in terms of solid content in the aqueous solution, and the parts of water used for the preparation of the aqueous solution was additionally described in the column for the parts of water in the following Table 1.

TABLE 1

| Ink composition | Number of Example | | | | | | | | | |
|---|---|---|---|---|---|---|---|---|---|---|
| Component | 1 | 2 | 3 | 4 | 5 | 6 | 7 | 8 | 9 | 10 |
| DR 60 | 1.00 | — | — | — | — | — | 0.20 | 0.02 | 0.60 | 1.00 |
| DY 54 | — | 1.00 | — | — | — | — | 0.15 | 0.02 | 0.45 | 0.75 |
| DB 72 | — | — | 1.00 | — | — | — | 0.65 | 0.06 | 1.95 | 3.25 |
| DR 92 | — | — | — | 1.00 | — | — | — | — | — | — |
| DY 160 | — | — | — | — | 1.00 | — | — | — | — | — |
| DB 60 | — | — | — | — | — | 1.00 | — | — | — | — |

TABLE 1-continued

| Ink composition | Number of Example | | | | | | | | | |
|---|---|---|---|---|---|---|---|---|---|---|
| Component | 1 | 2 | 3 | 4 | 5 | 6 | 7 | 8 | 9 | 10 |
| W 40 | 0.60 | 0.60 | 0.60 | — | — | — | 0.60 | 0.06 | 1.80 | 3.00 |
| BPS 30 | 0.07 | 0.07 | 0.07 | — | — | — | 0.07 | 0.01 | 0.20 | 0.35 |
| J 678 | — | — | — | 0.40 | 0.40 | 0.40 | — | — | — | — |
| G | — | — | — | 45.0 | 45.0 | 45.0 | 45.0 | 45.0 | 45.0 | 45.0 |
| DG | 40.00 | 40.00 | 40.00 | — | — | — | — | — | — | — |
| PG | 8.00 | 8.00 | 8.00 | 10.00 | 10.00 | 10.00 | 10.00 | 10.00 | 10.00 | 10.00 |
| SF 420 | 0.10 | 0.10 | 0.10 | 0.10 | 0.10 | 0.10 | 0.10 | 0.10 | 0.10 | 0.10 |
| Water | 50.23 | 50.23 | 50.23 | 43.50 | 43.50 | 43.50 | 43.23 | 44.73 | 39.90 | 41.55 |
| Total | 100 | 100 | 100 | 100 | 100 | 100 | 100 | 100 | 100 | 100 |

TABLE 2

| Ink composition | Number of Comparative Example | | | |
|---|---|---|---|---|
| Component | 1 | 2 | 3 | 4 |
| DR 60 | — | — | — | 0.002 |
| DY 54 | — | — | — | 0.002 |
| DB 72 | — | — | — | 0.006 |
| DB 359 | 1.00 | — | — | — |
| DR 152 | — | 1.00 | — | — |
| DB 165 | — | — | 1.00 | — |
| W 40 | 0.60 | 0.60 | 0.60 | 0.006 |
| BPS 30 | 0.07 | 0.07 | 0.07 | 0.001 |
| G | — | — | — | 45.00 |
| DG | 40.00 | 40.00 | 40.00 | — |
| PG | 8.00 | 8.00 | 8.00 | 10.00 |
| SF 420 | 0.10 | 0.10 | 0.10 | 0.10 |
| Water | 50.23 | 50.23 | 50.23 | 44.883 |
| Total | 100 | 100 | 100 | 100 |

In addition, the following evaluation tests of (1) to (4) were conducted with regard to the respective inks prepared in Examples 1 to 10 and Comparative Examples 1 to 4 described above. The test results are summarized in Table 3 below.

(1) Printability Test

The long-run inkjet printability was evaluated using a wide format inkjet printer "JV2-130" manufactured by MIMAKI ENGINEERING CO., LTD.

The solid printing having a width of 1 m and a length of 10 m was performed on the PX/MX premium matte paper manufactured by Seiko Epson Corporation under the printing conditions of 720 dpi×720 dpi, a single direction, 4PASS, and a 100% single color, and then the ejection failure of the nozzles was confirmed by the test pattern. The evaluation was conducted according to the following evaluation criteria of the three ranks of A to C.

(Evaluation Criteria)

A: Clogging of nozzles did not occur.

B: Clogging occurred in from 1 to 3 nozzles.

C: Clogging occurred in 4 or more nozzles.

(2) Tampering Detection Test

The solid printing of 30 cm×30 cm was performed on the superfine special paper manufactured by Seiko Epson Corporation using a wide format inkjet printer "JV2-130" manufactured by MIMAKI ENGINEERING CO., LTD. under the printing conditions of 720 dpi×720 dpi, a single direction, 4PASS, and a 25% single color, thereby preparing a test specimen. One droplet of each of acetone, butyl acetate, toluene, chloroform, and ethylene glycol monomethyl ether was dropped on the surface applied with ink of the test specimen thus obtained and then dried in a constant temperature oven at 50° C. for 3 hours so as to evaporate the organic solvents. The portions on the test specimen with the organic solvents dropped on them were visually inspected under a fluorescent lamp, and the evaluation was conducted according to the following evaluation criteria of the three ranks of A to C.

(Evaluation Criteria)

A: Bleeding of the dye can be clearly confirmed for all of the five organic solvents.

B: Bleeding of the dye is acknowledged but is not clear.

C: Bleeding of the dye is not acknowledged.

(3) Visibility Test of Written Information

The test specimen was prepared by performing printing in the same manner as in "(2) tampering detection test" described above. The characters of "NIPPON KAYAKU Co., Ltd." were written on the surface applied with ink of the test specimen thus obtained as the information using an oil-based ballpoint pen. The visibility of the written information was evaluated according to the following evaluation criteria of the two ranks of A and C under a fluorescent lamp.

(Evaluation Criteria)

A: Visibility of the written information is favorable and the characters are readable.

C: Visibility of the written information is poor and the characters are not readable or are significantly hardly readable.

Meanwhile, bleeding of the dye according to "(2) tampering detection test" above was not acknowledged in the test specimens of respective Examples even when the information was written using either an oil-based ballpoint pen or an oil-based magic pen. Consequently, it has been confirmed that the information can be written even on the printed surface printed with the water-based inkjet ink of the invention using a normal oil-based writing instrument.

(4) Reverse Mutation Test

As a screening test of non-GLP, the reverse mutation test was conducted using TA100 and TA98 as the strains in the presence and absence of S9mix by setting the test sample concentration to five concentration conditions for each in conformity with the guideline in Japan. The results were evaluated according to the following evaluation criteria of A and C.

Meanwhile, the dyes contained in the respective inks were used as the test samples for the present test.

(Evaluation Criteria)

A: negative

C: positive

TABLE 3

| Result of evaluation test | Number of Example | | | | | | | | | |
|---|---|---|---|---|---|---|---|---|---|---|
| | 1 | 2 | 3 | 4 | 5 | 6 | 7 | 8 | 9 | 10 |
| Printability | A | A | A | A | A | A | A | A | A | A |
| Tampering detection | A | A | A | A | A | A | A | A | A | A |
| Visibility of written information | A | A | A | A | A | A | A | A | A | C |
| Reverse mutation | A | A | A | A | A | A | A | A | A | A |

| Result of evaluation test | Number of Comparative Example | | | |
|---|---|---|---|---|
| | 1 | 2 | 3 | 4 |
| Printability | A | A | A | A |
| Tampering detection | A | A | A | C |
| Visibility of written information | A | A | A | A |
| Reverse mutation | C | C | C | A |

As can be apparently seen from the results of Table 3, each of Examples exhibited superlative results in all of the evaluation items except the result for the visibility test of the written information in Example 10. The content of the dye in the ink of Example 10 is 5%, and it has been confirmed that the information is hardly recognizable visually when the information was written on the printed surface of the printing substrate printed with this ink. From this result, it has been found out that the dye concentration in an ink is preferably 3% or less as described above when the ink is used in this manner.

In Comparative Examples, all of Comparative Examples 1 to 3 containing a dye having a cyano group and/or an azo group in the molecule exhibited positive in the reverse mutation test, and thus it has been found out that the dye of Comparative Examples is not a safe dye.

In addition, Comparative Example 4 is an ink in which the content of the dye was adjusted to 0.01%, and it has been confirmed that the tampering detection is difficult at this content of dye.

INDUSTRIAL APPLICABILITY

The water-based inkjet ink for tampering detection of the invention has the printability required as an inkjet ink, and enables easy determination of tampering performed using various kinds of organic solvents by visual inspection when used in securities or the like.

In addition, the water-based inkjet ink for tampering detection of the invention has high safety with regard to the environment or a human being, and thus is significantly suitable as a water-based inkjet ink for tampering detection.

The invention claimed is:

1. A method of tampering detection, comprising:
   contacting a surface of an article printed using at least one kind of dye selected from the group consisting of a disperse dye and an oil-soluble dye with at least one kind of water-soluble organic solvent, and water, wherein the dye does not contain a cyano group or an azo group, wherein
   the dye dissolves into the organic solvent and diffuses therein, whereby visual detection as bleeding indicates that tampering has occurred.

2. The method according to claim 1, wherein the dye is a quinophthalone dye.

3. The method according to claim 1, wherein the dye is an anthraquinone dye.

4. The method according to claim 1, wherein a content of the dye is from 0.1 to 10% by mass with respect to the total mass of the ink.

5. The method according to claim 1, wherein the dye is negative in a reverse mutation test.

6. The method according to claim 1, wherein the organic solvent is selected from the group consisting of a ketone solvent, an ester solvent, an aromatic hydrocarbon solvent, a halogenated hydrocarbon solvent and a polyhydric alcohol monoalkyl ether solvent.

* * * * *